(12) United States Patent
Kalender

(10) Patent No.: US 7,872,437 B2
(45) Date of Patent: Jan. 18, 2011

(54) METHOD FOR POSITION AND/OR SPEED CONTROL OF A LINEAR DRIVE

(75) Inventor: Tomas Kalender, Wolfpassing (AT)

(73) Assignee: Wittmann Kunststoffgeraete GmbH, Vienna (AT)

( * ) Notice: Subject to any disclaimer, the term of this patent is extended or adjusted under 35 U.S.C. 154(b) by 309 days.

(21) Appl. No.: 11/914,719

(22) PCT Filed: May 24, 2006

(86) PCT No.: PCT/AT2006/000214

§ 371 (c)(1),
(2), (4) Date: Nov. 16, 2007

(87) PCT Pub. No.: WO2006/125240

PCT Pub. Date: Nov. 30, 2006

(65) Prior Publication Data

US 2008/0150468 A1   Jun. 26, 2008

(30) Foreign Application Priority Data

May 25, 2005   (AT) ............................... A 897/2005

(51) Int. Cl.
*G05B 11/06* (2006.01)
(52) U.S. Cl. ....................... 318/687; 318/135; 318/686; 318/115; 318/119; 318/35; 310/12.03; 702/141; 73/514.15
(58) Field of Classification Search ................. 318/687, 318/135, 686, 22, 35, 38, 115, 119; 310/12.03; 702/141; 73/514.15
See application file for complete search history.

(56) References Cited

U.S. PATENT DOCUMENTS

| 3,638,093 | A |   | 1/1972  | Ross |
|---|---|---|---|---|
| 4,821,594 | A | * | 4/1989  | Rosheim et al. ........... 74/490.05 |
| 4,975,856 | A | * | 12/1990 | Vold et al. .................... 700/263 |
| 5,155,423 | A | * | 10/1992 | Karlen et al. ........... 318/568.11 |
| 5,250,880 | A | * | 10/1993 | Chesney et al. .............. 318/135 |
| 5,276,387 | A | * | 1/1994  | Gamble ...................... 318/135 |
| 5,416,397 | A | * | 5/1995  | Mazzara et al. ............. 318/696 |
| 5,847,535 | A | * | 12/1998 | Nordquist et al. ........... 318/700 |
| 5,887,268 | A | * | 3/1999  | Furukawa ..................... 701/23 |
| 5,912,541 | A | * | 6/1999  | Bigler et al. ................. 318/600 |

(Continued)

FOREIGN PATENT DOCUMENTS

DE            22 19 154         11/1972

(Continued)

OTHER PUBLICATIONS

Hiller, B; Lehner W-D.: Verbesserung der Regelgülte durch Ferraris-Sensoren. Antriebstechnik 40, 2001, No. 4.

*Primary Examiner*—Rita Leykin
(74) *Attorney, Agent, or Firm*—Greenblum & Bernstein, P.L.C.

(57) ABSTRACT

A method for position and/or speed control of a linear drive utilizing a converter having a control unit and being coupled to a motor of the linear drive. The method includes determining, in a sensor-free manner, a motor position, generating a motor position signal, generating an acceleration signal utilizing an MEMS accelerometer provided in the control unit and arranged on a moving part of the linear drive, mathematically converting the motor position signal and the acceleration signal to a speed signal, and utilizing the speed signal to control the linear drive.

20 Claims, 2 Drawing Sheets

U.S. PATENT DOCUMENTS

| | | | | |
|---|---|---|---|---|
| 5,967,580 A | * | 10/1999 | Rosheim | 294/88 |
| 6,137,255 A | * | 10/2000 | Skalski | 318/687 |
| 6,628,004 B1 | | 9/2003 | Boehringer et al. | |
| 7,075,260 B2 | * | 7/2006 | Maeda | 318/443 |
| 7,108,189 B2 | * | 9/2006 | Kilibarda | 235/475 |
| 7,117,067 B2 | * | 10/2006 | McLurkin et al. | 700/245 |
| 7,187,142 B2 | * | 3/2007 | Rehm | 318/400.04 |
| 2002/0107658 A1 | * | 8/2002 | McCall et al. | 702/141 |
| 2006/0165502 A1 | * | 7/2006 | Salerno | 409/235 |
| 2006/0169044 A1 | | 8/2006 | Hodgins et al. | |

FOREIGN PATENT DOCUMENTS

| | | |
|---|---|---|
| DE | 198 51 003 | 5/2000 |
| EP | 0 539 401 | 5/1993 |
| EP | 0 661 543 | 7/1995 |
| JP | 10 170303 | 6/1998 |
| WO | 2004/081583 | 9/2004 |

* cited by examiner

METHOD FOR POSITION AND/OR SPEED CONTROL OF A LINEAR DRIVE

CROSS-REFERENCE TO RELATED APPLICATIONS

The present application is a U.S. National Stage of International Patent Application No. PCT/AT2006/000214 filed May 24, 2006 which published as WO 2006/125240 on Nov. 30, 2006, and claims priority of Austrian Patent Application No. A 897/2005 filed May 25, 2005.

BACKGROUND OF THE INVENTION

1. Field of the Invention

The invention relates to a method for the position and/or speed control of a linear drive. The linear drive can, in particular, be a servo drive for a linear robot. The method provides that an electric motor is supplied via a converter having a control unit. The motor position is determined, in particular, in a sensor-free manner or via a position sensor. Furthermore, the invention also relates to a circuit layout for carrying out the method.

2. Discussion of Background Information

A known servo drive comprises an electric motor that is mechanically coupled to a position-measuring system. A servo converter with its output stage supplies the motor with, energy via a cable. The information of the position sensor is guided back to the servo amplifier with a cable. This is called position feedback. The measured position is differentiated to the speed. The rotational-speed controller is dependent on a high quality of the position signal, since a measurement noise or quantization noise appears amplified in the position signal due to the differentiation. The position controller directly processes the position signal and the position specification. A highly dynamic control of a servo drive therefore requires a position detection with high resolution, which conflicts with an economical solution because it is expensive.

With the highest demands on the control quality, the disadvantages of the differentiation can be eliminated by additionally using an acceleration sensor. The measured position and the acceleration are converted in a so-called observer into a speed signal with a considerably lower noise component, such as is indicated, e.g., in Hiller, B; Lehner W-D.: Verbesserung der Regelgüte durch Ferraris-Sensoren. Antriebstechnik 40, 2001, No. 4. The disadvantage of these solutions are the high additional costs for the acceleration sensor and the cabling.

Another device for obtaining a dynamically high-quality, partially synthesized signal for the acceleration of the rotor of a drive is known from DE 198 51 003 A1.

More economical solutions can be achieved, in theory, if a cost-effective sensor with a low resolution is used. Alternatively, the position measurement can be omitted completely if a sensor-free method for position determination is used, as is known, e.g., from EP 0 539 401 B. The disadvantage of both solutions is the low quality of the control, which is not acceptable in the application as linear robot.

SUMMARY OF THE INVENTION

The present invention is directed to a method of the type mentioned at the outset, which, on the one hand, avoids the above disadvantages and with which, on the other hand, the quality of the control is qualitatively increased.

The method according to the invention is characterized in that a motor position signal and an acceleration signal, generated via an accelerometer provided in the control unit and arranged on the moving part of the linear drive, is mathematically converted to a speed signal. The speed signal is used in controlling a drive. With the invention it is possible, for the first time, to achieve an economical detection of the rotor position, which also has excellent drive dynamics, for controlling a linear drive. The disadvantages of low-resolution position detection are compensated for via the acceleration signal, which is generated by an accelerometer arranged on an entrained part.

Furthermore, it is advantageous, for the power or quality of the control, that the differentiation of the motor position signal is dispensed with due to the observer. In fact, the position measurement signal, which is relatively imprecise with low-resolution position measurement systems, is upgraded through the accelerometer to a very serviceable speed signal.

According to a particularly simple embodiment of the invention, the sensor-free determination of the motor position is carried out via the control signals of a reluctance motor, in particular, a stepper motor. This reluctance motor is utilized as a drive for the carriage. The motor position can be determined via the control signals of the reluctance motor.

According to another embodiment of the invention, the sensor-free determination of the motor position is derived from the measured variables current and voltage available in the control unit. A motor position signal and an acceleration signal are converted in an observer and used for controlling the drive. It is advantageous if, regardless of how the motor position is detected, the acceleration signal can be used for controlling the position and/or speed.

According to an alternative embodiment of the invention, the motor position is measured via a position sensor and a motor position signal is produced. The motor position signal is converted in an observer utilizing the acceleration signal and is used for controlling the drive. As already mentioned above, it is also possible with this type of motor position detection system to use the acceleration signal for controlling the position and/or speed.

The invention is also directed to a circuit layout for carrying out the method described above.

The circuit layout for carrying out the method is characterized in that a control unit comprising at least one position controller and a downstream rotational speed controller is provided with a accelerometer on a moving part of a linear drive, in particular, on a carriage. The motor position detection takes place in a sensor-free manner via measured variables current and voltage available in the control unit or via a position sensor. In such a system, on the one hand, the motor position detection and, on the other hand, the accelerometer, are connected to an observer and the output of the observer is provided to the input of the rotational-speed controller. With this circuit layout according to the invention, it is possible for the first time to carry out an optimal, economical control of drives, in particular, linear drives, while utilizing cost-effective components like the accelerometer. Utilizing the circuit layout according to the invention, the drive electronics can be entrained on the moving part of the drive, and the acceleration sensor (or accelerometer) can be integrated directly into the drive controller as an MEMS component. An extraordinarily cost-effective embodiment is thus created. As a result, the costs of the currently very complex detection of the rotor position with a high-resolution position-measurement system can be markedly reduced, and this can be accomplished without having to do without the optimal drive dynamics.

According to another embodiment of the invention, the accelerometer is embodied as a microelectromechanical system (MEMS) and is integrated into the entrained control unit.

Externally, MEMS of this type have the design of small electronic components and are produced in enormous quantities, which makes their original costs very low.

According to another embodiment of the invention, the accelerometer is embodied as a multiaxial microelectromechanical system (MEMS). The use of multiaxial accelerometers can also be particularly advantageous, particularly if the control unit is responsible for the control of several axes.

According to another embodiment of the invention, the converter and the control unit are embodied with the accelerometer as a unit, and are provided on the moving part of the linear drive, in particular, on a carriage. An extremely compact solution is thereby achieved.

The invention also provides for a method for position and/or speed control of a linear drive utilizing a converter having a control unit and being coupled to a motor of the linear drive, wherein the method comprises determining, in a sensor-free manner, a motor position, generating a motor position signal, generating an acceleration signal utilizing an MEMS accelerometer provided in the control unit and arranged on a moving part of the linear drive, mathematically converting the motor position signal and the acceleration signal to a speed signal, and utilizing the speed signal to control the linear drive.

The linear device may comprise a servo drive for a linear robot. The motor may comprise a reluctance motor and the determining utilizes control signals of the reluctance motor. The reluctance motor may comprise a stepper motor. The determining may utilize measured current and voltage. The determining may utilize measured current and voltage in the control unit. The mathematically converting may occur in an observer and may be utilized to regulate the linear drive. The moving part of the linear device may comprise a carriage. The movable part may comprise a movable carriage and the linear rive further comprises a toothed belt.

The invention also provides for a circuit layout for carrying out the method described above, wherein the converter comprises at least one position controller and a downstream rotational speed controller and wherein the at least one position controller, the downstream rotational speed controller, and the MEMS accelerometer comprise a unit arranged on the moving part of the linear drive.

A motor position detection device and the MEMS accelerometer may be connected to an observer. An output of the observer may be input to the rotational speed controller. The MEMS accelerometer may be integrated into the control unit.

The invention also provides for a method for position and/or speed control of a linear drive utilizing a converter and an MEMS accelerometer arranged in a control unit, wherein the method comprises generating a motor position signal, generating an acceleration signal utilizing the MEMS accelerometer, converting the motor position signal and the acceleration signal to a speed signal, and utilizing the speed signal to control the linear drive. The control unit is arranged on a moving part of the linear drive.

The converting may comprise mathematically converting and the method may further comprise determining, in a sensor-free manner, a motor position. The movable part may comprise a movable carriage and the linear drive may further comprise a toothed belt.

The invention also provides for a method for position and/or speed control of a linear drive comprising a movable carriage and a toothed belt, wherein the method comprises arranging a motor and a MEMS accelerometer on the carriage, generating a motor position signal, generating an acceleration signal utilizing the MEMS accelerometer, converting the motor position signal and the acceleration signal to a speed signal, and utilizing the speed signal to control the linear drive.

The method may further comprise arranging a converter and a control unit on the carriage. The converter may include the control unit, the control unit includes the MEMS accelerometer. The converting may comprise mathematically converting. The method may further comprise determining, in a sensor-free manner, a motor position.

BRIEF DESCRIPTION OF THE DRAWINGS

The invention is described in more detail based on exemplary embodiments, which are shown in the drawings wherein they show.

DETAILED DESCRIPTION OF THE INVENTION

By way of introduction, it should be noted that embodiments having the same parts or states are provided with the same reference numbers or the same component names. However, the entire specification can be applied analogously to the same parts or states with the same reference numbers or the same component names.

Figure 1:
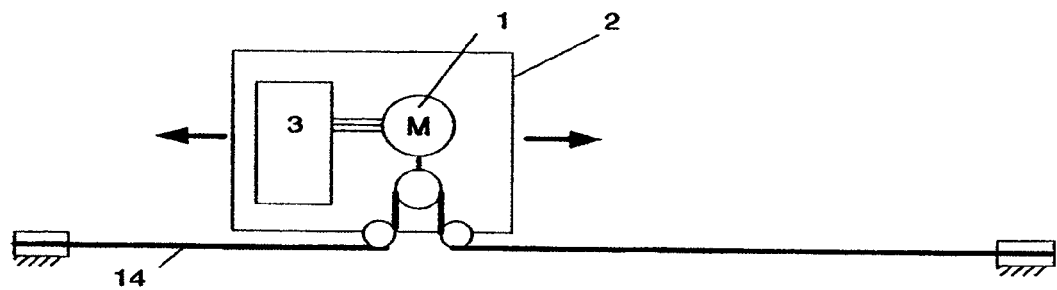
FIG. 1 shows a linear drive.

FIG. 1 shows a linear drive utilizing a motor 1 driving a carriage 2. The carriage 2 can have the form of a linear robot. The motor 1 is arranged in the carriage 2. A converter 3, which is preferably a servo converter, is mounted in the vicinity of the motor 1 and is entrained with or arranged in the carriage 2. The motor 1 drives the carriage 2, e.g., via a toothed belt 14, thereby causing the carriage 2 to move along the direction indicated by an arrow in FIG. 1. The converter 3 is mounted on the carriage 2 together with the motor 1 and thus moves with the carriage 2.

Figure 2:
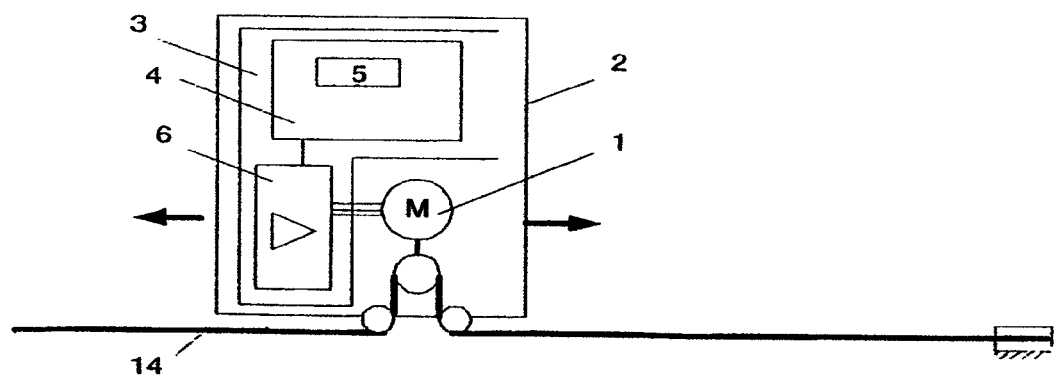
FIG. 2 shows the linear drive with an accelerometer arranged on the moving part of the drive.

FIG. 2 shows a motor 1, which is embodied in particular as a permanently excited synchronous motor, coupled to the converter 3 which includes a control unit 4. In this embodiment, the motor position is determined, in particular, in a sensor-free manner or via a position sensor. The decentralized structure utilizing entrained drive electronics makes it possible to supplement the control unit 4 of a servo amplifier with an integrated accelerometer 5. The accelerometer 5 can be embodied, e.g., as a microelectromechanical system (MEMS) and can be embedded as a component on a circuit board of the control unit 4.

The converter 3, which optionally includes a power stage 6, and the control unit 4 which includes the accelerometer 5, are preferably embodied as a unit and is provided or arranged on the moving part of the linear drive, in particular, on the carriage 2.

Naturally, it can also be advantageous to use a multiaxial accelerometer 5, particularly if the control unit 4 is responsible for the control of several axes.

Figure 3:
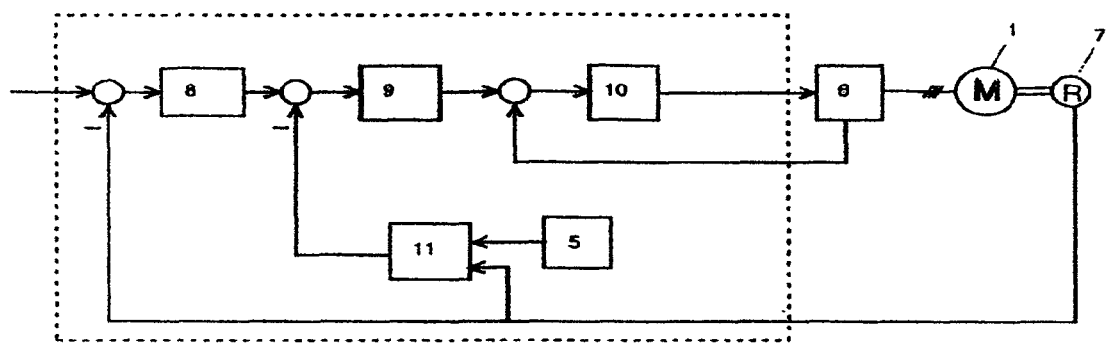
FIG. 3 shows a circuit diagram of a control system utilizing a position sensor.

FIG. 3 shows a position sensor 7 provided on or coupled to the motor 1. The motor 1 is supplied with power via the power stage 6. The drive electronics arranged on the moving part of the drive are composed of a position controller 8, a downstream rotational-speed controller 9, and a current regulator 10. The current regulator 10 is connected to the power stage 6.

The motor position signal generated by the position sensor 7 and an acceleration signal generated via the accelerometer 5 are both provided to the control unit 4. These signals are mathematically converted to a speed signal in an observer 11. This speed signal is then subsequently used for controlling the drive.

Figure 4:
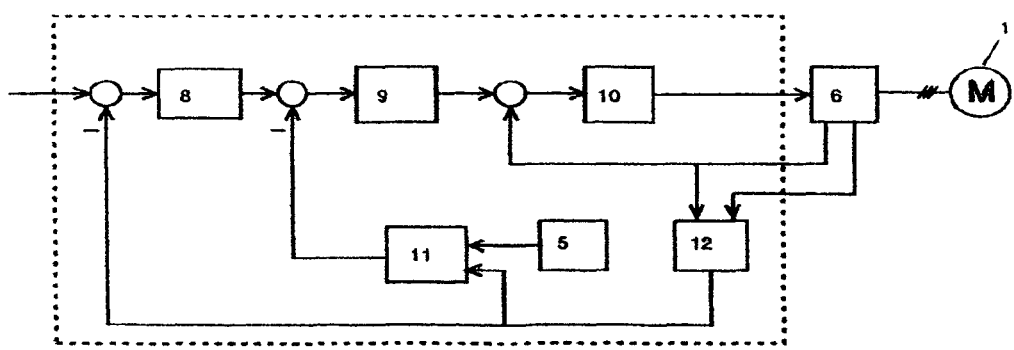
FIG. 4 shows a circuit diagram of a control system utilizing sensor-free motor position detection.

FIG. 4 shows how the motor position is determined in a sensor-free manner. The motor position is determined from the measured variables current and voltage available from the control unit in a combination element, having the form of the motor position detection device 12, via an algorithm. A motor position signal is generated. This motor position signal and the acceleration signal of the accelerometer 5 are then converted in the observer 11 and used for controlling the drive.

With a particularly simple embodiment, the sensor-free determination of the motor position is carried out via the control signals of a reluctance motor, in particular, a stepper motor. This reluctance motor is provided as drive for the carriage. The motor position can thus be determined via the control signals of the reluctance motor.

As is known per se, a mathematical, model-based method is used in the observer 11, which method generates the speed signal from the signal of the accelerometer 5 and the calculated motor position.

The above-mentioned advantages are therefore achieved with the method and the circuit layout of the invention in that the drive electronics are entrained on the moving part of the drive, and the acceleration sensor, i.e., the accelerometer, is integrated directly into the drive controller as an MEMS component.

In conclusion, as a matter of form, it is noted that individual components and assemblies are shown disproportionately and not to scale in the drawings for better comprehension of the invention.

The invention claimed is:

1. A method for position and/or speed control of a linear drive utilizing a converter having a control unit and being coupled to a motor of the linear drive, the method comprising:
   determining, in a sensor-free manner, a motor position;
   generating a motor position signal;
   generating an acceleration signal utilizing an MEMS accelerometer provided in the control unit and arranged on a moving part of the linear drive;
   mathematically converting the motor position signal and the acceleration signal to a speed signal; and
   utilizing the speed signal to control the linear drive.

2. The method of claim 1, wherein the linear device comprises a servo drive for a linear robot.

3. The method of claim 1, wherein the motor comprises a reluctance motor and the determining utilizes control signals of the reluctance motor.

4. The method of claim 3, wherein the reluctance motor comprises a stepper motor.

5. The method of claim 1, wherein the determining utilizes measured current and voltage.

6. The method of claim 1, wherein the determining utilizes measured current and voltage in the control unit.

7. The method of claim 1, wherein the mathematically converting occurs in an observer and is utilized to regulate the linear drive.

8. The method of claim 1, wherein the moving part of the linear device comprises a carriage.

9. The method of claim 1, wherein the movable part comprises a movable carriage and the linear drive further comprises a toothed belt.

10. A circuit layout for carrying out the method of claim 1, wherein the converter comprises at least one position controller and a downstream rotational speed controller and wherein the at least one position controller, the downstream rotational speed controller, and the MEMS accelerometer comprise a unit arranged on the moving part of the linear drive.

11. The circuit layout of claim 10, wherein a motor position detection device and the MEMS accelerometer are connected to an observer.

12. The circuit layout of claim 11, wherein an output of the observer is input to the rotational speed controller.

13. The circuit layout of claim 10, wherein the MEMS accelerometer is integrated into the control unit.

14. A method for position and/or speed control of a linear drive utilizing a converter and an MEMS accelerometer arranged in a control unit, the method comprising:
   generating a motor position signal;
   generating an acceleration signal utilizing the MEMS accelerometer;
   converting the motor position signal and the acceleration signal to a speed signal; and
   utilizing the speed signal to control the linear drive,
   wherein the control unit is arranged on a moving part of the linear drive.

15. The method of claim 14, wherein the converting comprises mathematically converting and further comprising determining, in a sensor-free manner, a motor position.

16. The method of claim 14, wherein the movable part comprises a movable carriage and the linear drive further comprises a toothed belt.

17. A method for position and/or speed control of a linear drive comprising a movable carriage and a toothed belt, the method comprising:
   arranging a motor and a MEMS accelerometer on the carriage;
   generating a motor position signal;
   generating an acceleration signal utilizing the MEMS accelerometer;
   converting the motor position signal and the acceleration signal to a speed signal; and
   utilizing the speed signal to control the linear drive.

18. The method of claim 17, further comprising arranging a converter and a control unit on the carriage, wherein the converter includes the control unit, the control unit includes the MEMS accelerometer.

19. The method of claim 17, wherein the converting comprises mathematically converting.

20. The method of claim 17, further comprising determining, in a sensor-free manner, a motor position.

* * * * *